(12) United States Patent
Kepner et al.

(10) Patent No.: US 12,490,901 B2
(45) Date of Patent: *Dec. 9, 2025

(54) SYSTEM AND METHOD OF HIGH PRECISION ANATOMICAL MEASUREMENTS OF FEATURES OF LIVING ORGANISMS INCLUDING VISIBLE CONTOURED SHAPE

(71) Applicants: Terrence J. Kepner, Somers Point, NJ (US); Lawrence H. Fox, Blue Bell, PA (US)

(72) Inventors: Terrence J. Kepner, Somers Point, NJ (US); Lawrence H. Fox, Blue Bell, PA (US)

( * ) Notice: Subject to any disclaimer, the term of this patent is extended or adjusted under 35 U.S.C. 154(b) by 274 days.

This patent is subject to a terminal disclaimer.

(21) Appl. No.: 18/373,050

(22) Filed: Sep. 26, 2023

(65) Prior Publication Data

US 2024/0016386 A1 Jan. 18, 2024

Related U.S. Application Data

(63) Continuation-in-part of application No. 16/840,395, filed on Apr. 5, 2020, now Pat. No. 11,776,116.

(60) Provisional application No. 62/835,280, filed on Apr. 17, 2019.

(51) Int. Cl.
*G06T 19/20* (2011.01)
*A61B 5/00* (2006.01)
*A61B 5/107* (2006.01)
*A61B 34/10* (2016.01)

(52) U.S. Cl.
CPC .......... *A61B 5/0064* (2013.01); *A61B 5/1078* (2013.01); *A61B 34/10* (2016.02); *G06T 19/20* (2013.01); *G06T 2210/41* (2013.01); *G06T 2219/008* (2013.01)

(58) Field of Classification Search
CPC .......... G06T 7/0012; G06T 1/20; G06T 1/60; G06T 7/75; G06T 17/00; G06T 2200/04; G06T 2207/30004; G06T 2219/00
See application file for complete search history.

(56) References Cited

U.S. PATENT DOCUMENTS

2015/0324114 A1* 11/2015 Hurley .................... G16Z 99/00
715/850

* cited by examiner

*Primary Examiner* — Sumati Lefkowitz
*Assistant Examiner* — Michael Adam Shariff
(74) *Attorney, Agent, or Firm* — Michael J. Feigin, Esq.; Feigin and Fridman LLC (57) ABSTRACT

Anatomical measurements of non-visible aspects of features of living organisms that include a visible contoured shape on the anatomical region of the living organism is disclosed. The system and method include an imager configured to take a series of images of an anatomical region of a living organism, such as a human patient in a clinic, doctor's office, or hospital. The system and method create a three-dimensional digital anatomical model of the exterior or visible part of the anatomical region that includes a target feature, such as a breast, nose, foot, or tumor. The target feature within the three-dimensional digital model is then isolated and manipulated to find measurements of non-visible aspects of the feature, such as mass, distances between visible points which pass through invisible tissues, e.g., depth and base width, surface distance between visible points, volume, area, surface area, circumference, and surface angle measurements of the feature.

22 Claims, 11 Drawing Sheets

SYSTEM AND METHOD OF HIGH PRECISION ANATOMICAL MEASUREMENTS OF FEATURES OF LIVING ORGANISMS INCLUDING VISIBLE CONTOURED SHAPE

FIELD OF THE DISCLOSED TECHNOLOGY

The disclosed technology relates to systems and methods for determining anatomical measurements. More specifically, the disclosed technology relates to a system and method of performing high precision anatomical measurements of non-visible aspects of features of living organisms that include a visible contoured shape.

BACKGROUND OF THE DISCLOSED TECHNOLOGY

Various surgeries are performed today which involve the cutting of skin from one location, and placement on another location. Such surgeries include reconstruction of organs such as the nose or breasts. Likewise, skin can be removed and is often desirable or even medically imperative to know how much to remove and how much to add. In order to determine the amount of skin to remove, medical professionals typically perform anatomical measurements with tape measures, goniometers, displacement in water, and other methods. Unfortunately, measuring anatomy with these techniques is often subject to high error rates and inaccuracies. Therefore, typically in the current state of the art, a surgeon cuts more skin than required, for example, from the abdomen, in order to place the skin over another part of the body and ensure that enough skin is available for use. This leads to longer recovery times and more damage to the body than necessary, but avoids running the risk of having too little skin at the time of surgery.

The problem of determining how much material (such as skin) is needed during surgery or the weight and size of various anatomical features in general, effects many disciplines including sports medicine, pediatric medicine, plastic surgery, physical therapy, medical aesthetics, high performance clothing and apparel, veterinary treatment, medical treatment and diagnosis to name a few. The treatment of many medical conditions often requires detailed measurements of a patient's anatomy to determine treatment plans, treatment progress, signs of injury or infection as well as fitting for medical devices.

Accordingly, there is a very strong need in the medical field for more accurate anatomical measurements of features of living organisms that have visible external contoured shapes, such as organs, appendages, and extremities of the living organism.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

SUMMARY OF THE DISCLOSED TECHNOLOGY

Disclosed herein is a method of performing anatomical measurements of non-visible aspects of a feature of a living organism that has a visible external contoured shape. In embodiments, the method includes the steps of imaging an anatomical region of the living organism, which includes a feature having a visible contoured shape, acquiring measurements of visible aspects of the imaged anatomical region, producing a three-dimensional digital model of the anatomical region based on the acquired measurements, determining which feature is within the three-dimensional digital model of the anatomical region, isolating the feature determined to be within the three-dimensional digital model of the anatomical region from the anatomical region into a separate three-dimensional digital model of the feature to provide a three-dimensional representation of the entire feature, and measuring the separate three-dimensional digital model of the feature to yield a measurement of a non-visible aspect of the feature.

In some embodiments, the visible external contoured shape includes a unique contour of the feature, which is visible to, and identifiable by, the naked eye, when looking at the living organism.

In some embodiments, the visible external contoured shape includes a contour of the feature having an external surface which is measurable using a tape measure or goniometer, while the living organism is whole.

In some embodiments, the visible external contoured shape includes a feature that can be traced or measured by wrapping a film around the exterior surface of the feature, while the living organism is whole.

In some embodiments, the visible external contoured shape has a visible outer circumference. This is in contrast to internal contoured shapes, which lack visibility and are disposed under or within the outer circumference of the feature.

In some embodiments, the step of determining which feature is within the three-dimensional digital model of the anatomical region is automatic based on inputs entered about the type of feature known to be within the imaged anatomical region.

In other embodiments, the step of determining which feature is within the three-dimensional digital model of the anatomical region is automatic based on a known shape of the feature within the imaged anatomical region.

In certain embodiments, the step of determining which feature is within the three-dimensional digital model of the anatomical region is automatic based on manually entered inputs of the contours of the feature known to be within the imaged anatomical region.

In embodiments, the method further includes the step of identifying the feature determined to be within the three-dimensional digital model of the anatomical region by manually inputting at least one of a plurality of points, a line segment, or a closed shape around the edges of the feature to delineate the outline of the feature prior to isolating the feature from the three-dimensional digital model of the anatomical region.

In some embodiments, the step of isolating the feature determined to be within the three-dimensional digital model of the anatomical region from the anatomical region into a separate three-dimensional digital model of the feature includes cutting the feature determined to be within the three-dimensional digital model of the anatomical region at a plane of the delineated outline of the feature.

In embodiments, the step of measuring the separate three-dimensional digital model of the feature to yield a measurement of a non-visible aspect of the feature includes drawing a linear line segment from a first point on the feature to a second point on the feature to delineate at least one of a width, length, height, or circumference of the feature.

In some embodiments, the step of measuring the separate three-dimensional digital model of the feature to yield a measurement of a non-visible aspect of the feature further includes drawing a plane through the feature to delineate at least one of a width, length, height or circumference of the feature organs.

In embodiments, the non-visible aspect of the feature includes a volume, a depth, a surface angle, an area, a base width or a mass of the feature.

In some embodiments, the depth is determined by measuring the distance of a linear segment drawn from a first point on the feature through the feature to a second point on the feature.

In other embodiments, the volume is determined by measuring the distance of a first linear segment drawn to delineate the widest width of the feature from left to right, by measuring the distance of a linear segment drawn from a first point on the feature through the feature to a second point on feature from front to back, and by utilizing the points that delineate the outline of the feature.

In embodiments, the step of imaging the anatomical region of the living organism includes capturing a whole exterior of the anatomical region with a camera. In some embodiments, the step of imaging the anatomical region of the living organisms includes capturing only the exterior of the anatomical region with a camera, without capturing any portion of the anatomical region which is invisible to the naked eye.

In some embodiments, the feature of the living organism that has a contoured shape includes an appendage, an extremity, or an organ of the living organism.

In embodiments, the camera is the camera of a handheld electronic device selected from the group consisting of a scanner, smartphone, computer tablet, action camera, video recorder, glasses, goggles, headset, smart glasses, augmented reality (AR) headset, and virtual reality (VR) headset.

In some embodiments, the step of acquiring the measurements of the visible aspects of the imaged anatomical region includes measuring, using orientation sensors, the whole exterior of the anatomical region during the imaging of the anatomical region.

In embodiments, the measurements are obtained by comparing individually captured images.

In some embodiments, the orientation sensors include sensors selected from the group consisting of accelerometers, gyroscopes, motion sensors, global positions systems, and local positioning systems.

Also disclosed is a system of performing anatomical measurements of non-visible aspects of a feature having a visible contoured shape in an anatomical region of a living organism. In embodiments, the system includes an imager for imaging the anatomical region of the living organism, and an electronic device including a graphic user interface, an application programming interface, a processor, a memory, and a logic stored on the memory and executable by the processor, wherein when executed the logic performs the steps of the method disclosed herein.

In some embodiments, the system further includes a cloud storage device for storing images and data captured and gathered by the imager and electronic device, and a cloud computing engine. The electronic device interfaces via the application programming interface to store or process images and data in the cloud storage device, memory, or cloud computation engine.

For purposes of this disclosure, the following definitions are used:

"Anatomical" is defined as "relating to the body structure of an organism."

"Anatomical region" is defined as "a region on an organism's body encompassing one or more organs."

"Contour" is defined as "an outline, especially one representing or bounding the shape or form of something, such as a body part."

"Appendage" is defined as "a projecting part of a living organism, with a distinct appearance or function."

"Extremity" is defined as "the farthest or most remote part, section, or point of an object, such as a limb of the body of a living organism."

"Organ" is defined as "a part of an organism that is typically self-contained and has a specific vital function."

"Mass" is used interchangeably depending on context to refer to "a coherent, typically large body of matter with no definite shape" and "the quantity of matter which an object contains."

"Three-dimensional" is defined as "having or appearing to have length, width, and depth."

"Digital model" is defined as "a digitized three-dimensional representation of a person or thing or of a proposed structure." The representation may be provided on a two dimensional surface, such as on a two dimensional screen, or may be a three dimensional hologram in space.

"Isolate" used interchangeably with "cut-off" is defined as "the separation, in electronic form, of a part of the body being measured, where the separation is placed at least partially, substantially fully, or fully in a plane invisible to a viewer of the actual part of the body."

"Visible" aspect of anatomy is defined as "a portion of a living organism's anatomy that is visible to the naked eye and/or measurable with a tape measure or goniometer, along the exterior of the living organism, while the living organism is whole."

"Non-visible" aspect of anatomy is defined as "a portion of a living organism's anatomy that is invisible to the naked eye and unable to be accurately measured within 5% using a tape measure or goniometer while the living organism is whole."

"Application programming interface" or "API" is defined as "a computing interface exposed by a particular software program, library, operating system, internet service, or network service, to allow third parties to use the functionality of that software program, and communicate with other devices."

"Logic" is defined as "(i) logic implemented as computer instructions and/or data within one or more computer processes and/or (ii) logic implemented in electronic circuitry."

"Computer-readable medium" is defined as "a medium capable of storing data in a format readable by a mechanical device and excludes any transitory signals, but includes any non-transitory data storage circuitry, e.g., buffers, cache, and queues, within transceivers of transitory signals."

"Processor" is defined as "a machine, device, apparatus, or process that processes something, such as a computer processor or central processing unit."

"Memory" is defined as "any physical device capable of storing information temporarily, like RAM (random access memory), or permanently, like ROM (read-only memory)."

"Query" is defined as "a question for information, data, or signals made by a computer system that is processed and executed by a processor."

"Graphic user interface" or "GUI" is defined as "a computer program and/or interface on an electronic device, such as a computer, smart phone, or tablet, that includes one or more inputs and/or outputs, which allow a user to interact with the electronic device."

"Input" is defined as "what is put in, taken in, or operated on by any process or system, or the place where, or a device through which, energy, information, or instructions enter a system."

"Output" is defined as "the amount of something produced by a person, device, machine, apparatus, system, or process, or the place where, or a device through which, energy, information, instructions leave a system."

"Cloud storage device" is defined as "remote device to which data is transmitted, stored, maintained, managed, backed up, and made available to users over a network."

"Cloud computing engine" is defined as "a remote infrastructure and/or processor that stores, maintains, manages, backs up, and makes available data stored on a cloud storage device."

Any device or step to a method described in this disclosure can comprise or consist of that which it is a part of, or the parts which make up the device or step. The term "and/or" is inclusive of the items which it joins linguistically and each item by itself. "Substantially" is defined as at least 95% of the term being described and/or "within a tolerance level known in the art and/or within 5% thereof. Any device or aspect of a device or method described herein can be read as "comprising" or "consisting" thereof.

DETAILED DESCRIPTION OF EMBODIMENTS OF THE DISCLOSED TECHNOLOGY

The present disclosed technology provides a system and method of performing high precision anatomical measurements of non-visible aspects of features of living organisms that include a visible contoured shape on an anatomical region of the living organism. The system and method include an imager configured to take a series of images, such as by a scan or video, of an anatomical region of a living organism, such as a human patient in a clinic, doctor's office, or hospital. The system and method create a three-dimensional digital anatomical model of the exterior or visible part of the anatomical region that includes a target feature, such as a breast, nose, foot, or tumor. The target feature within the three-dimensional digital model is then isolated and manipulated to find measurements of non-visible aspects of the feature, such as mass, distances between visible points which pass through invisible tissues, e.g., depth and base width, volume, area, and surface angle measurements of the feature.

Figure 1:
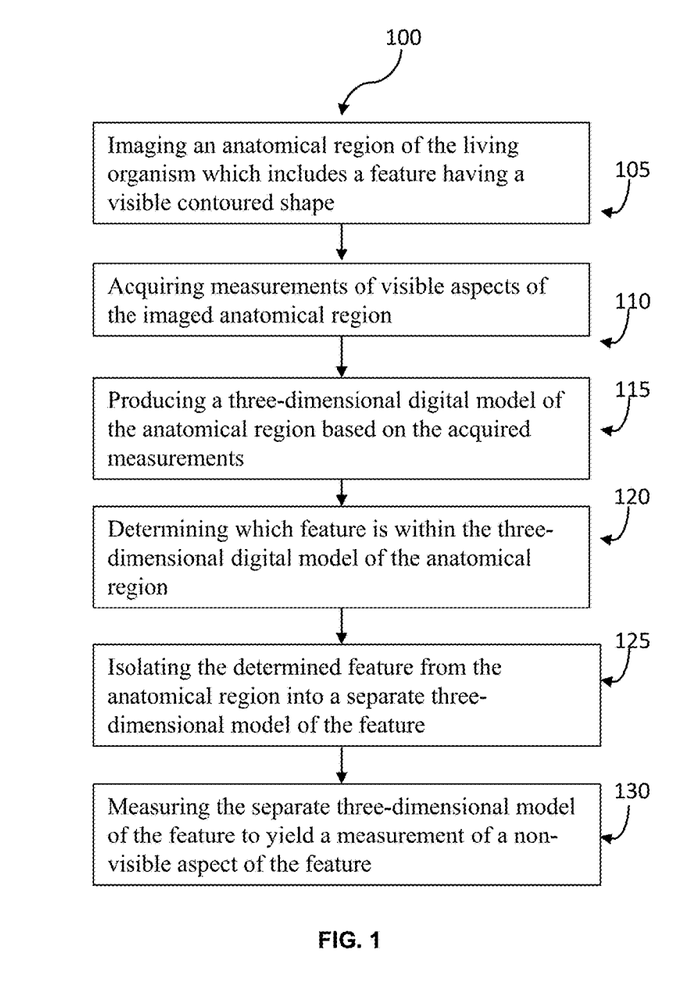
FIG. 1 shows a flow chart of the method according to one embodiment of the present disclosed technology.
Figure 2:
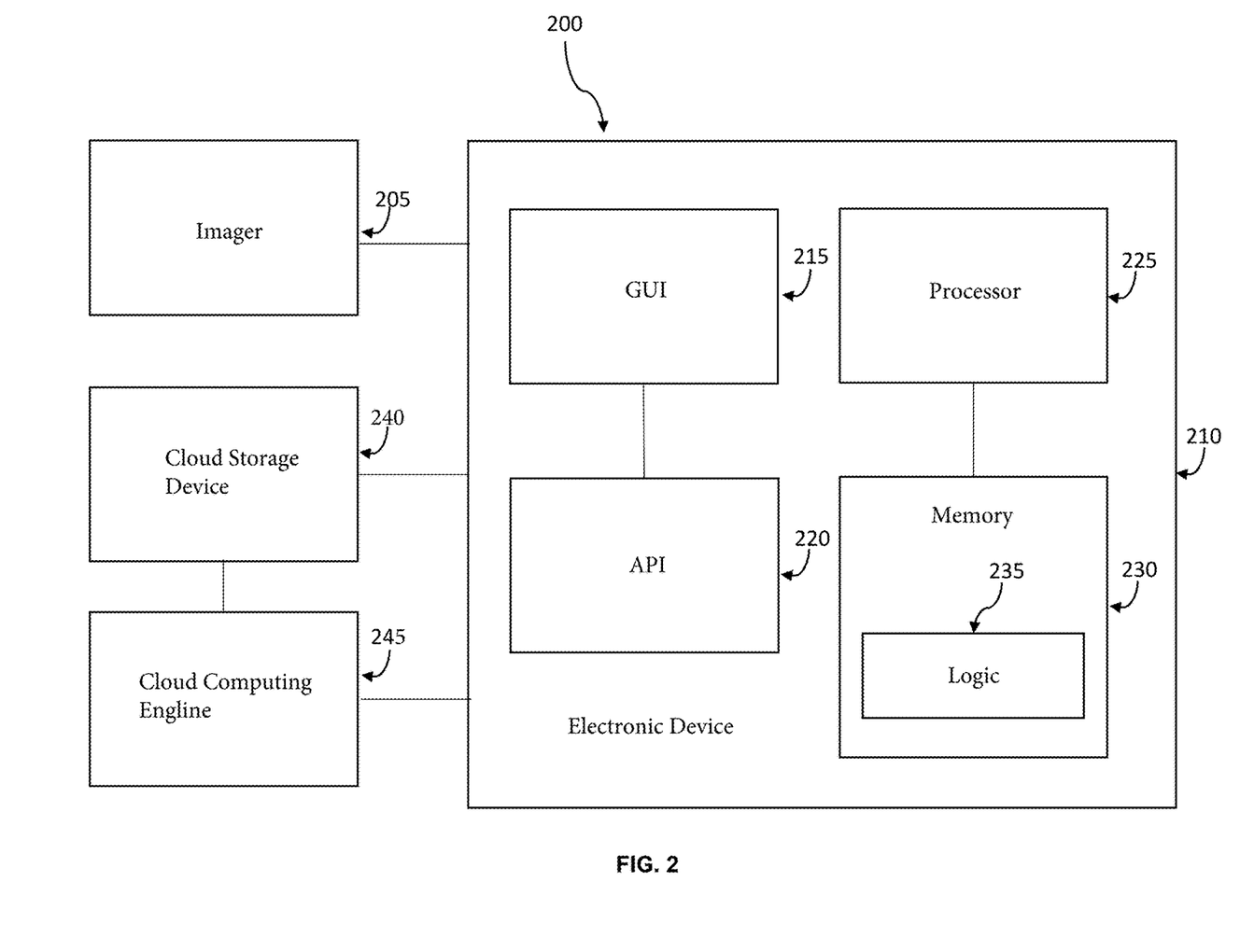
FIG. 2 shows a high-level block diagram of the system according to one embodiment of the present disclosed technology.

Referring now to FIGS. 1 and 2, simultaneously, there is shown a flow chart of the method according to one embodiment of the present disclosed technology. FIG. 2 shows a high-level block diagram of the system according to one embodiment of the present disclosed technology. The present disclosed technology provides a method 100 and system 200 of performing anatomical measurements of non-visible aspects of a feature having a visible contoured shape in an anatomical region of a living organism. In embodiments, the method includes the steps of imaging an anatomical region of the living organism, which includes a feature having a visible contoured shape 105, acquiring measurements of visible aspects of the imaged anatomical region 110, producing a three-dimensional digital model of the anatomical region based on the acquired measurements 115, determining which feature is within the three-dimensional digital model of the anatomical region 120, isolating the feature determined to be within the three-dimensional digital model of the anatomical region from the anatomical region into a separate three-dimensional digital model of the feature to provide a three-dimensional representation of the entire feature 125, and measuring the separate three-dimensional digital model of the feature to yield a measurement of a non-visible aspect of the feature 130.

Features of an anatomical region including a contoured shape include:
- *external organs such as the breast, nose, penis, and ear, among others;
- *appendages such as the head, arms, and legs, as well as components thereof, such as lips, elbows, wrists, fingers, thighs, knees, calves, ankles, and toes;
- *extremities such as the hands and feet;
- *body organs such as neck, shoulder, abdomen, waist, and buttocks; and
- *masses such as tumors, moles, skin tags, warts, cysts, and bunions.

Further, one can measure an area of skin/fat/flab which is being grabbed and pulled from what is a resting surface position of the body.

The system 200 comprises an imager 205 for imaging the anatomical region of the living organism, and an electronic device 210 including a graphic user interface 215, an application programming interface 220, a processor 225, a memory 230, and a logic 235 stored on the memory 230 and executable by the processor 225. The logic 235, when executed, performs the steps of the method 100 in whole or in part. In some embodiments, the system 200 further comprises a cloud storage device 240 for storing images and data captured and gathered by the imager 205 and/or the electronic device 210, and a cloud computing engine 245. The electronic device 210 interfaces via the application programming interface 220 to store or process images and data captured by the imager 205 in the cloud storage device 240, memory 230, or cloud computing engine 245. In embodiments the imager 205 comprises a camera. The camera may comprise the camera of a handheld electronic device, such as a scanner, smartphone, computer tablet, action camera, video recorder, glasses, goggles, headset, smart glasses, augmented reality (AR) headset, and virtual reality (VR) headset.

In embodiments, the step of acquiring measurements of visible aspects of the imaged anatomical region 110 includes measuring, using orientation sensors, the whole exterior of the anatomical region during the imaging of the anatomical region. In some embodiments, the measurements are obtained by comparing individually captured images. In some embodiments, the orientation sensors comprise sensors selected from the group consisting of accelerometers, gyroscopes, motion sensors, global positions systems, and local positioning systems.

For example, step 110 comprises a collection of points in space, each point having at least one different X, Y, and Z coordinate or a unique set of coordinates thereof. The points are determined based on a determined distance from the imager to each point based on how fast or far the point moves as the images created change relative to one another and/or based on the sensors to measure distance. Lines are then drawn between those points. Those lines create a mesh representing the surface of the model.

When imaging in step 105, for example by scanning, the position and orientation of the imager and the living organism or subject being imaged can vary from scan to scan. This results in a difference in the X, Y, Z coordinates for the models. When performing comparative measurements between two or more models, the position of the measurements must be in the exact location despite the X, Y, Z origins being different. This poses a difficulty because the offsets of the models will cause the measurements to be in the wrong location. To solve this, each three-dimensional digital model is given coordinates in a three-dimensional plane and corresponding points on the object (e.g., person or part thereof) which have matching distances in space which can be overlaid and given the same corresponding points. This can be done manually (e.g., by selecting the same points such as an edge of a nose, breast, narrowest extent of an ankle, position of a shoulder, belly button, or the like with a preference for parts which are less likely to change from one measurement to another at a different time). Using statistical modeling (e.g., best match for the most amount of points, and best matches for edges) can automate the process and can use thousands of points between two or more such models. A transformation matrix to orient the latter models according to the position of earlier models can be used. This allows measurements to be repeated from model to model despite differences in scan to scan without human intervention and introduction of human error in positioning the measurement.

In some embodiments, the three dimensional model may be provided in the form of a three dimensional hologram.

In embodiments, the step of determining which feature is within the three-dimensional digital model of the anatomical region 120 is automatic based on inputs entered about the type of feature known to be within the imaged anatomical region. For example, a user may input into the system 200 that the feature is a nose or a breast or that the anatomical region is a head or a torso. Accordingly, based on this input, the system 200 automatically determines that the feature within the three-dimensional digital model of the anatomical region is a breast or a nose.

In other embodiments, the step of determining which feature is within the three-dimensional digital model of the anatomical region 120 is automatic based on a known shape of the feature within the imaged anatomical region. For example, the memory 230 may include known shapes of all features of a human body such that the system 200 automatically identifies the feature if and when the shape of the feature appears on the three-dimensional digital model of the anatomical region.

In certain embodiments, the step of determining which feature is within the three-dimensional digital model of the anatomical region 120 is automatic based on manually entered inputs of the contours of the feature known to be within the imaged anatomical region. For example, after the three-dimensional digital model of the anatomical region has been formed, a user, knowing where the feature is disposed, may outline or delineate the feature within the three-dimensional digital model by tracing or outlining the contours of the feature via inputs into the system 200. In this way, the user manually identifies the feature within the three-dimensional digital model of the anatomical region.

Figure 3:
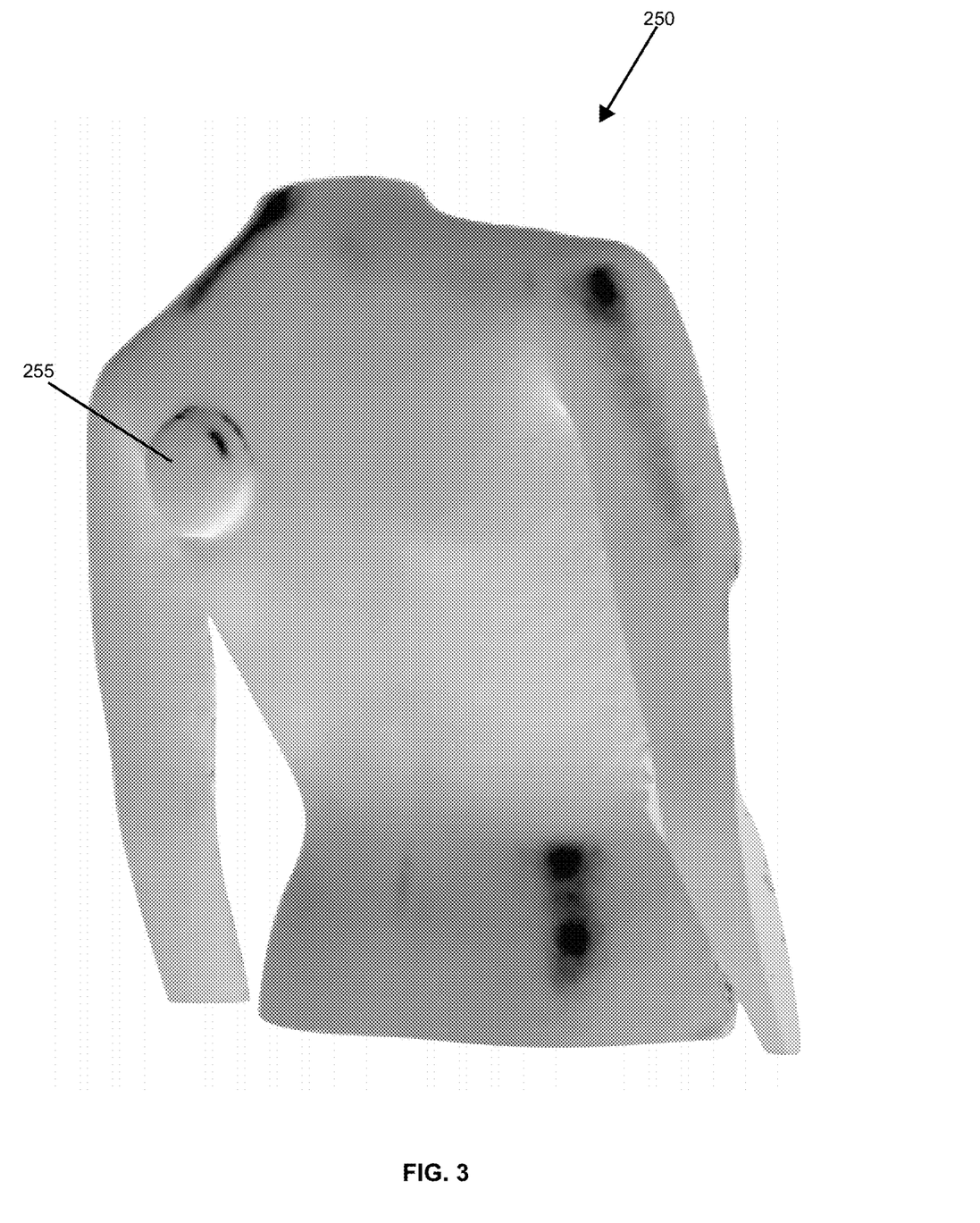
FIG. 3 shows a rendered three-dimensional digital model of an anatomical region, namely a back, including a feature, namely a tumor mass, after imaging the anatomical region according to one embodiment of the disclosed technology.

Referring now to FIG. 3, there is shown a rendered three-dimensional digital model of an anatomical region, namely a back, including a feature, namely a tumor mass, after imaging the anatomical region according to one embodiment of the disclosed technology. In embodiments, imaging the anatomical region of the living organism includes capturing a whole exterior of the anatomical region with an imager such as a camera. In practice, a specific anatomical region including a target feature is imaged in order to provide a three-dimensional digital model of the anatomical region. The purpose being to develop a three-dimensional digital model including the target feature so as to subsequently isolate and measure the feature for surgery, resection, manipulation, therapy, treatment, and the like. For example, in FIG. 3, a three-dimensional digital model of the back 250 has been rendered and includes a tumor 255, e.g., the target feature, having a visible contoured shape. Once the target feature has been included in a three-dimensional digital model, the feature can be further identified and isolated as described below.

Figure 4:
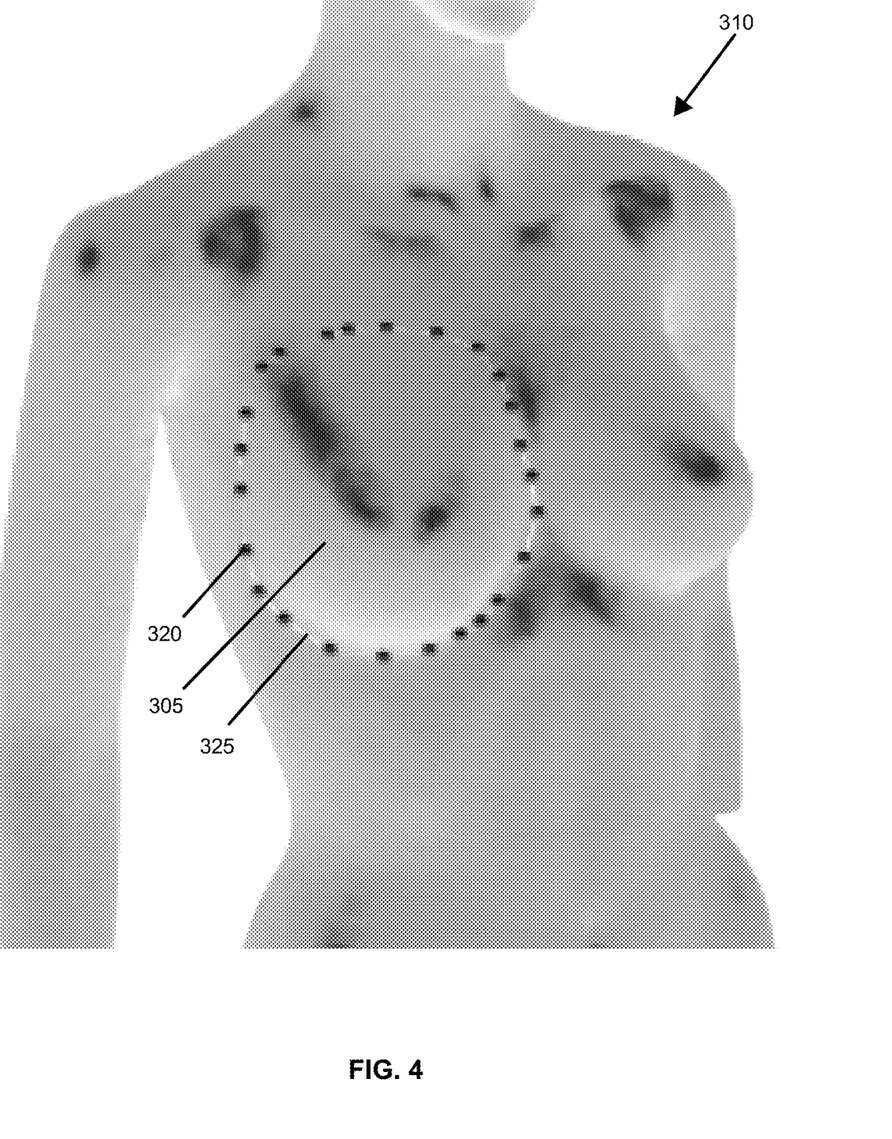
FIG. 4 shows the identification of a feature, namely a breast, on the three-dimensional digital model of the anatomical region, which has been determined to be within the anatomical region, by way of manually inputting various points around the edges of the breast to delineate the outline of the breast for isolation into an separate three-dimensional digital model according to one embodiment of the disclosed technology.
Figure 5:
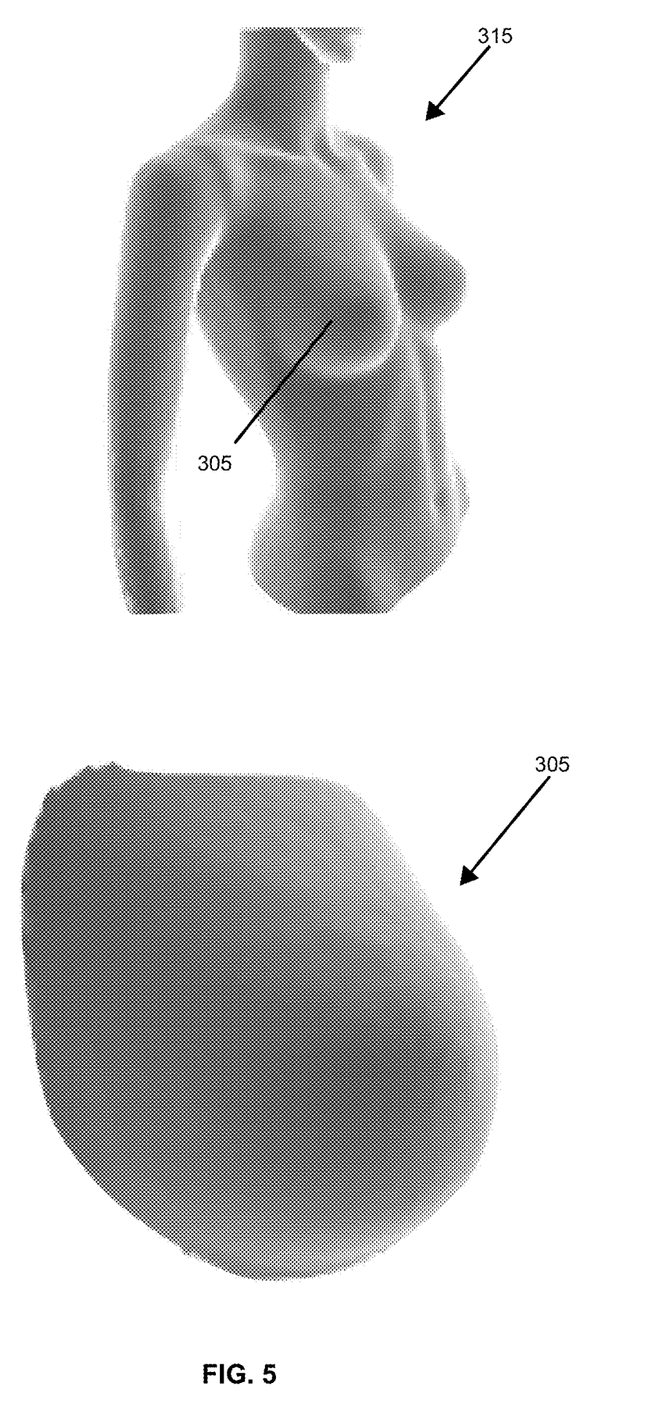
FIG. 5 shows a before and after of the three-dimensional digital model of the anatomical region and the separate three-dimensional digital model of the feature, namely the breast, which has been isolated by way of cutting the feature at a plane of the delineated outline of the feature to create the point of isolation from the three-dimensional digital model of the anatomical region according to one embodiment of the disclosed technology.

Referring now to FIG. 4-5, there is shown the identification of a feature, namely a breast, on the three-dimensional digital model of the anatomical region, namely the torso, which has been determined to be within the torso, by way of manually inputting various points around the edges of the breast to delineate the outline of the breast for isolation into an separate three-dimensional digital model according to one embodiment of the disclosed technology. In embodiments, the method further includes the step of identifying the feature 305 determined to be within the three-dimensional digital model 310 of the anatomical region 315 by manually inputting at least one of a plurality of points 320, line segments 325, or a closed shape around the edges of the feature 305 to delineate the outline of the feature 305 prior to isolating the feature 305 from the three-dimensional digital model of the anatomical region 315. To identify the feature 305, various points 320 are input, drawn, placed, and/or arranged around the target feature 305, i.e., the feature which a user wants to isolate from the original three-dimensional digital model of the anatomical region into a separate three-dimensional digital model of the feature. When input around the target feature 305, the points 320 may be joined by the line segments 325 to delineate or outline the target feature 305. Once delineated, the target feature 305 is ready for isolation. For example, in FIG. 4, a target breast has been delineated on the original three-dimensional digital model for isolation. The points have been drawn around the edges of the breast where they meet the chest wall and connected via line segments to accurately delineate the breast.

Figure 6:
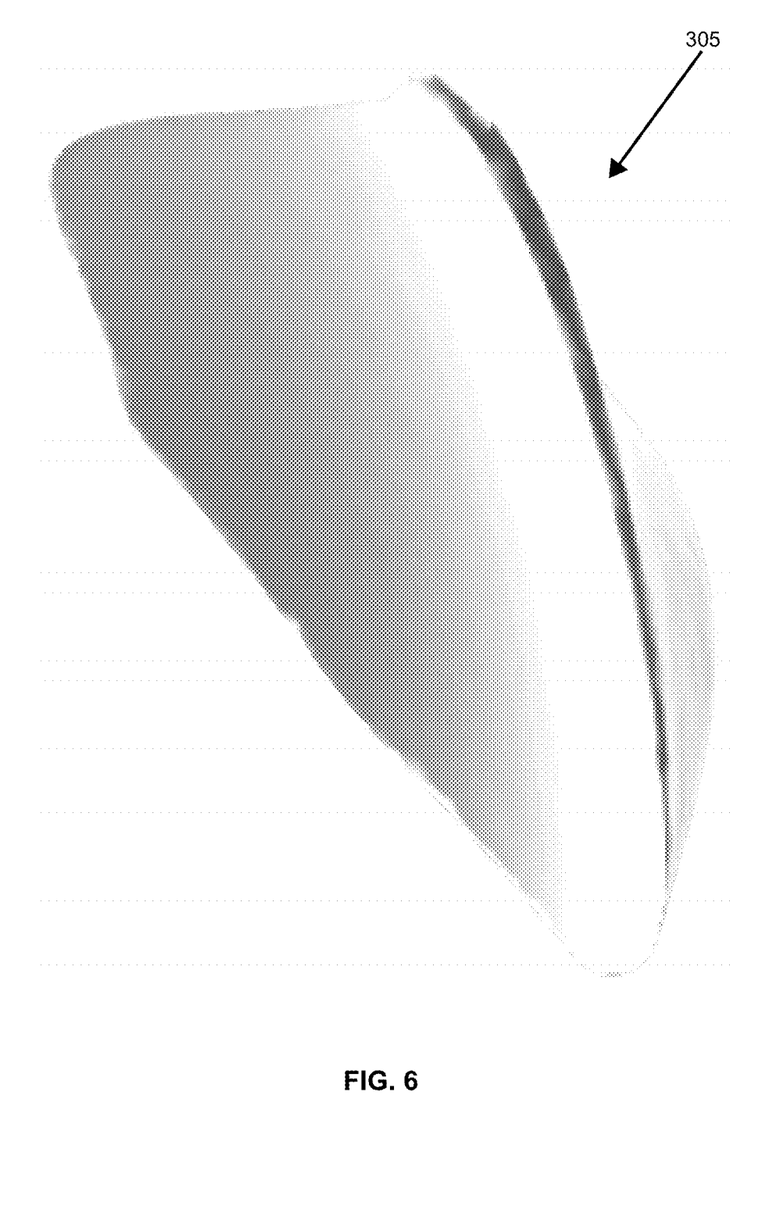
FIG. 6 shows a rear view of a three-dimensional digital model of an isolated feature, namely a breast, after being identified in the three-dimensional digital model of the anatomical region by way of outlining points around the breast where the breast meets the chest cavity according to one embodiment of the disclosed technology.
Figure 7:
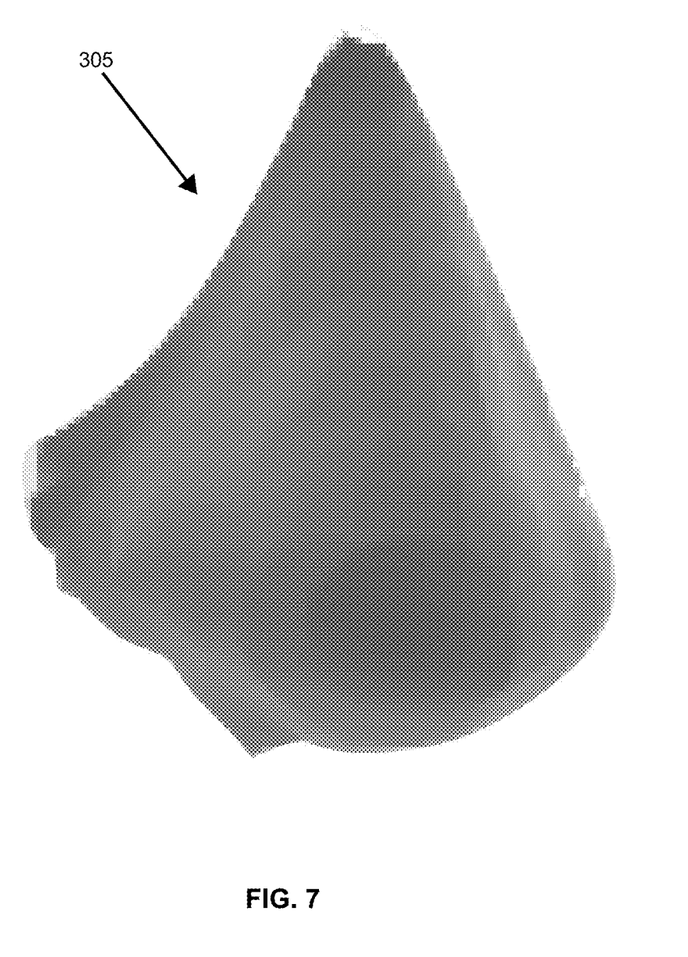
FIG. 7 shows a perspective front view of a three-dimensional digital model of an isolated feature, namely a nose, after being identified in the three-dimensional digital model of the anatomical region by way of outlining points around the nose where the nose meets the cheeks according to one embodiment of the disclosed technology.

Referring now to FIGS. 5-7, simultaneously, FIG. 5 shows a before and after of the three-dimensional digital model of the anatomical region and the separate three-dimensional digital model of the feature, namely the breast, which has been isolated by way of cutting the feature at a plane of the delineated outline of the feature to create the point of isolation from the three-dimensional digital model of the anatomical region according to one embodiment of the disclosed technology. FIG. 6 shows a rear view of a three-dimensional digital model of an isolated feature, namely a breast, after being identified in the three-dimensional digital model of the anatomical region by way of outlining points around the breast where the breast meets the chest cavity according to one embodiment of the disclosed technology. FIG. 7 shows a perspective front view of a three-dimensional digital model of an isolated feature, namely a nose, after being identified in the three-dimensional digital model of the anatomical region by way of outlining points around the nose where the nose meets the cheeks according to one embodiment of the disclosed technology. In some embodiments, the step of isolating the feature determined to be within the three-dimensional digital model of the anatomical region from the anatomical region into a separate three-dimensional digital model of the feature includes cutting the feature 305 determined to be within the three-dimensional digital model of the anatomical region 315 at a plane of the delineated outline of the feature 305. For example, in FIG. 5, the target breast has been isolated from the original three-dimensional digital model of the anatomical region by way of cutting the target breast at the plane of the delineated outline or along a plane of the chest wall. FIG. 6 displays a rear view of the isolated breast. FIG. 7 shows a separate three-dimensional digital model of a nose that has been isolated from an original three-dimensional digital model of a head by way of cutting the nose at a plane of a delineated outline or along a plane of the cheeks.

Figure 8:
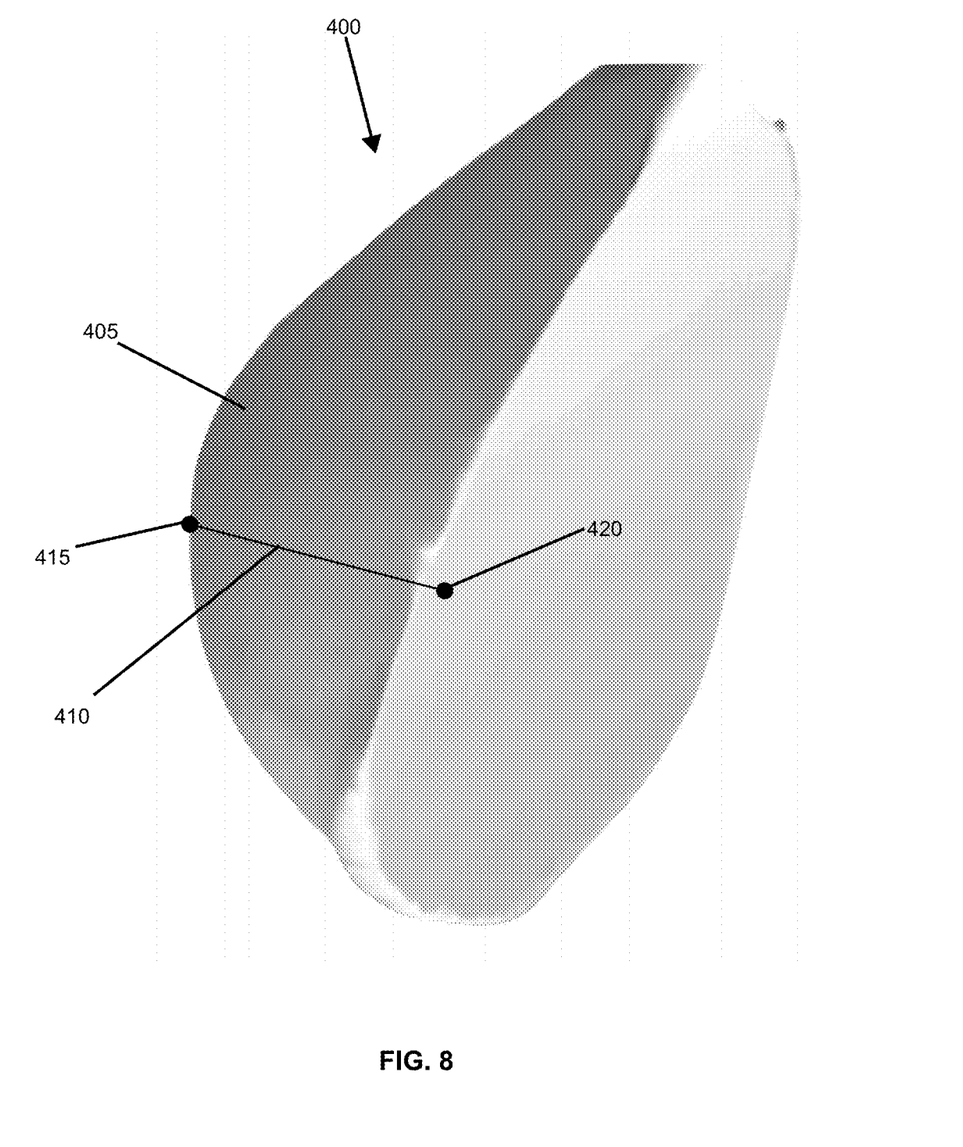
FIG. 8 shows a perspective rear view of a separate three-dimensional digital model of a feature, namely a breast, being measured to determine the depth of the feature after being isolated from the three-dimensional digital model of the anatomical region according to one embodiment of the disclosed technology.
Figure 9:
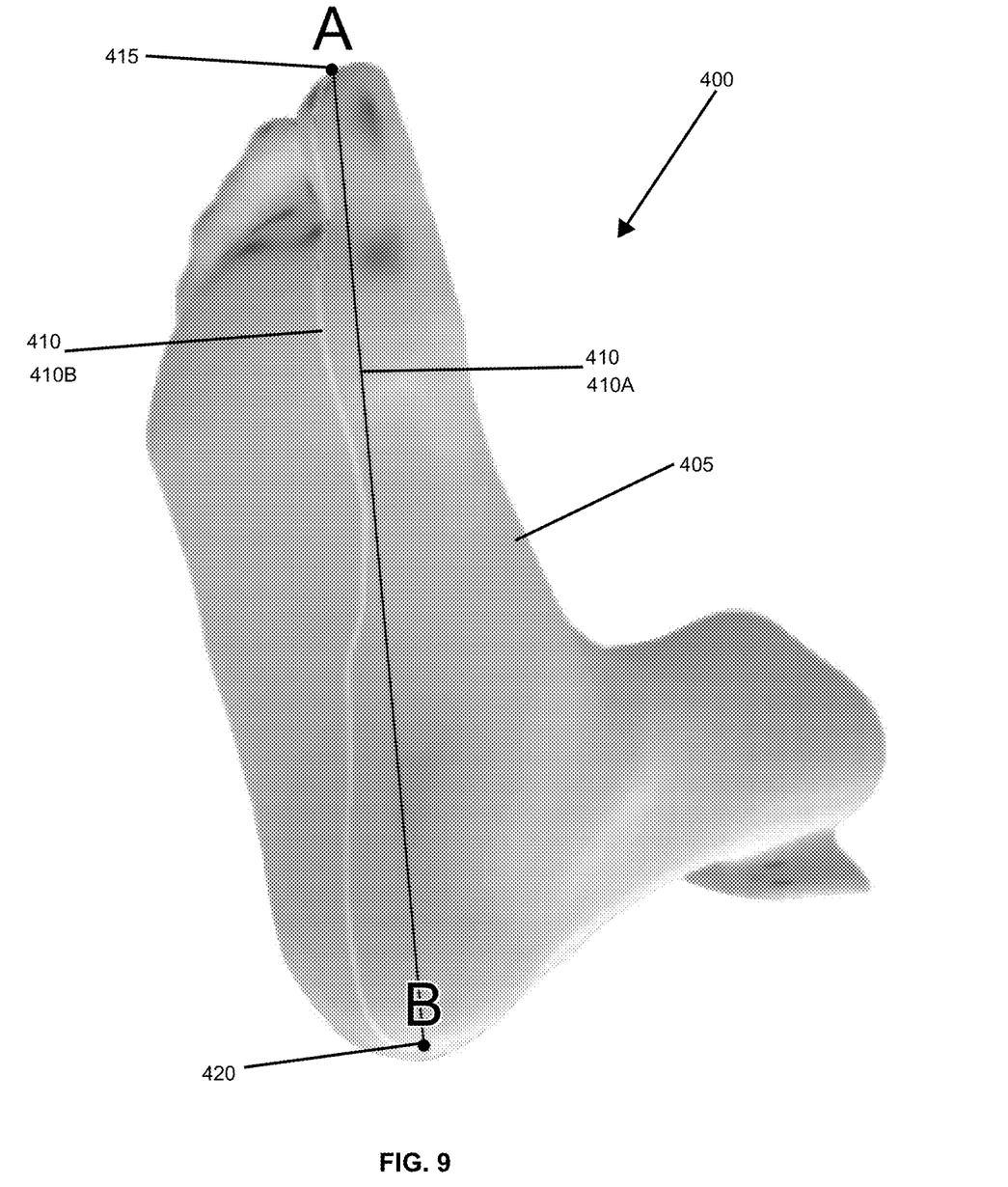
FIG. 9 shows a perspective bottom view of a separate three-dimensional digital model of a feature, namely a foot, illustrating one manner in which the feature may be measured via a point to point measurement from first end of the feature to a second end of the feature along a surface and directly from end to end to determine a distance after the feature has been isolated from the three-dimensional digital model of the anatomical region according to one embodiment of the disclosed technology.
Figure 10:
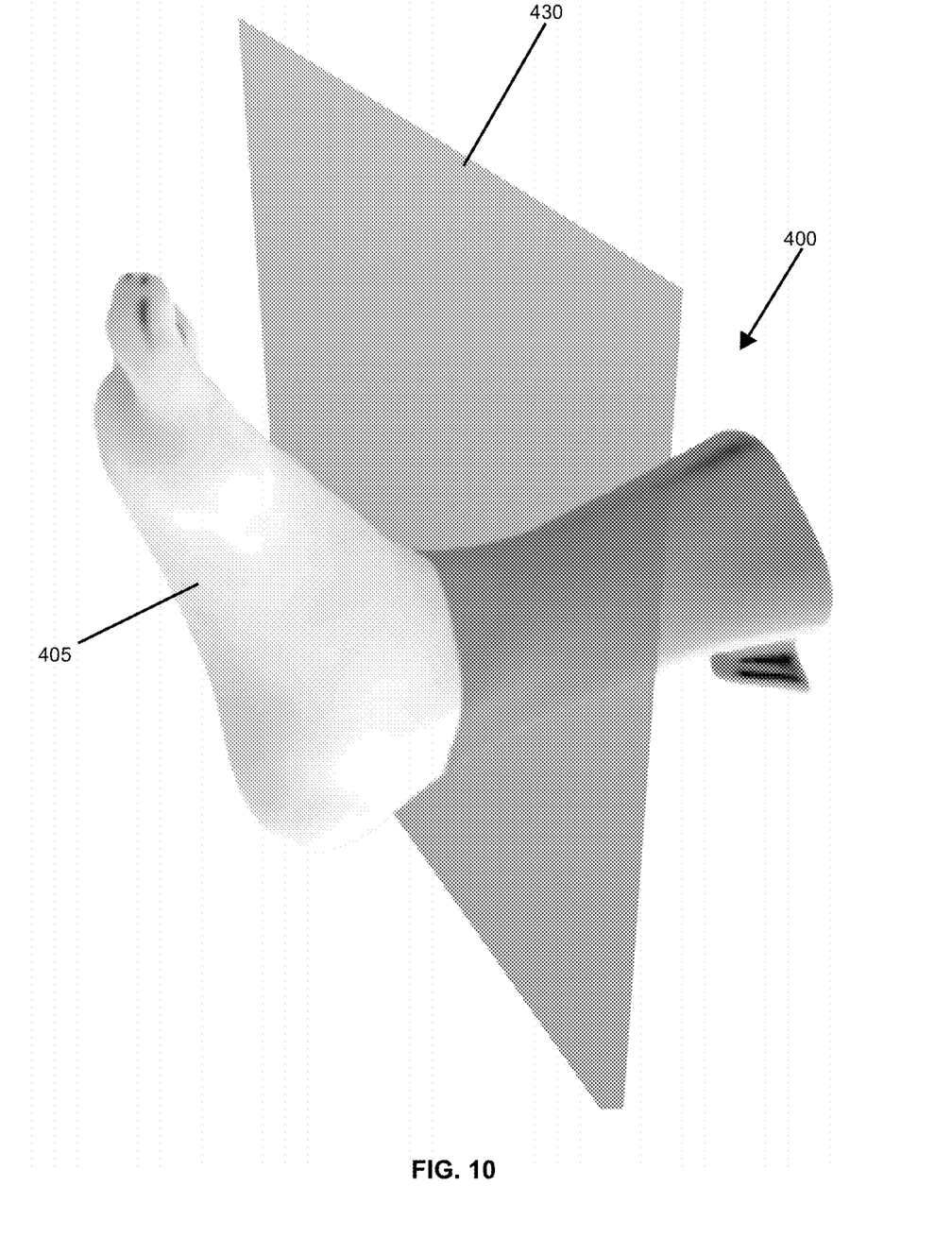
FIG. 10 shows a perspective view of a separate three-dimensional digital model of a feature, namely a foot, being measured to determine the volume of the feature after being isolated from the three-dimensional digital model of the anatomical region according to one embodiment of the disclosed technology.
Figure 11:
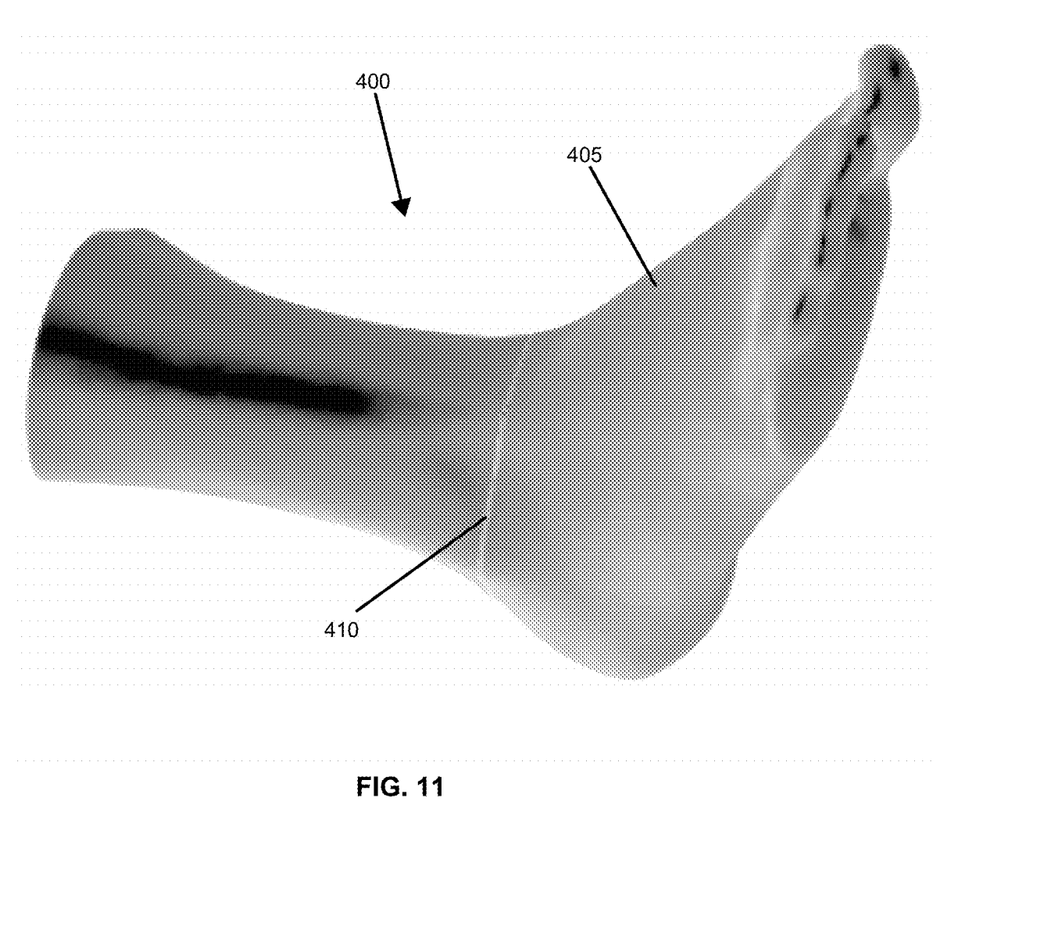
FIG. 11 shows a perspective view of a separate three-dimensional digital model of a feature, namely a foot, being measured to determine the circumference of the feature after being isolated from the three-dimensional digital model of the anatomical region according to one embodiment of the disclosed technology.

Referring now to FIGS. 8-11, simultaneously, FIG. 8 shows a perspective rear view of a separate three-dimensional digital model of a feature, namely a breast, being measured to determine the depth of the feature after being isolated from the three-dimensional digital model of the anatomical region according to one embodiment of the disclosed technology. FIG. 9 shows a perspective bottom view of a separate three-dimensional digital model of a feature, namely a foot, illustrating one manner in which the feature may be measured via a point to point measurement from first end of the feature to a second end of the feature along a surface and directly from end to end to determine a distance after the feature has been isolated from the three-dimensional digital model of the anatomical region according to one embodiment of the disclosed technology. FIG. 10 shows a perspective view of a separate three-dimensional digital model of a feature, namely a foot, being measured to determine the volume of the feature after being isolated from the three-dimensional digital model of the anatomical region according to one embodiment of the disclosed technology. FIG. 11 shows a perspective view of a separate three-dimensional digital model of a feature, namely a foot, being measured to determine the circumference of the feature after being isolated from the three-dimensional digital model of the anatomical region according to one embodiment of the disclosed technology.

In embodiments, the step of measuring the separate three-dimensional digital model 400 of the feature 405 to yield a measurement of a non-visible aspect of the feature 405 includes drawing a line segment 410 from a first point 415 on the feature 405 to a second point 420 on the feature 405 to delineate at least one of a width, length, height, or circumference of the feature. In some embodiments, the step of measuring the separate three-dimensional digital model 400 of the feature 405 to yield a measurement of a non-visible aspect of the feature 405 further includes drawing a plane through the feature 405 at the intersection where the feature extends from the body of the living organism to delineate at least one of a width, length, height or circumference of the feature. Non-visible aspects of the feature 405 include for example, a volume, an area, a depth, a surface angle, a base width, or a mass of the feature.

In Table 1, below, a patient's torso was imaged on three separate visits to render a three-dimensional digital model of the patient's torso at each visit for the purpose of obtaining measurements of non-visible aspects of the patient's breast. At each visit, the patient's breast was isolated from the three-dimensional digital model of the patient's torso into a separate three-dimensional digital model of the breast for the purpose of obtaining measurements of the breast. On the first visit, the patient's breast, i.e., the isolated three-dimensional digital model of the patient's breast, was isolated and measured, prior to infusion treatment, to obtain baseline measurements of the breast for comparison to the breast post infusion treatment. On the second and third visits, the patient's breast was isolated and measured after infusion of 100 cc and 200 cc, respectively. The non-visible aspects of the patient's breast that were measured after each visit and/or treatment included volume, area, base width, and depth.

TABLE 1

Patient Breast Measurements of Non-visible Aspects Pre- and Post-Infusion Treatment

| Model | Date of Patient's Visit | Reason for Patient's Visit | Non-Visible Aspect Measurements of Patient's Breast | | | |
|---|---|---|---|---|---|---|
| | | | Volume | Area | Base Width | Depth |
| 1 | Mar. 8, 2019 | Pre-Treatment | 240.57 cm³ | 223.15 cm² | 13.59 cm | 3.79 |
| 2 | Mar. 15, 2019 | Treatment 1- 100 cc | 358.40 cm³ | 277.61 cm² | 13.42 cm | 4.02 |
| 3 | Mar. 25, 2019 | Treatment 2- 200 cc | 452.05 cm³ | 293.64 cm² | 15.91 cm | 4.52 |

FIG. 8 demonstrates one way in which the depth of the breast may be measured by a point to point measurement connected by a line segment. In some embodiments, the depth of a feature is determined by measuring the distance of a linear segment drawn from a first point on the feature through the feature to a second point on the feature. For example, in FIG. 8, a first point 415 is input at the apex of the breast and a second point 420 is generated and input at the base of the breast. A line segment 410 is input to connect the points 415, 420. The line segment 410 then measures and provides the distance between the points 415, 420 to provide a depth of the breast.

FIG. 9 demonstrates one way in which the surface distance and/or length of a feature 405, namely a foot, may be measured according to one embodiment. First, a three-dimensional digital model 400 of a foot is rendered. Next, a first point A 415 is input at the apex of the big toe of the foot, or at the point furthest away from the foot, and a second point B 420 is input at the apex of the heel. To obtain the length of the foot, a linear line segment 410A is input to connect the points 415, 420. The line segment 410A then measures and provides the distance between the points 415, 420 to provide the length of the foot. To obtain the surface distance, a non-linear line segment 410B is input along the surface of the foot from the first point 415 to the second point 420. The line segment 410B then measures the distance of the surface between the points 415, 420 to provide the surface distance of the foot.

FIG. 10 demonstrates one way in which the volume of a feature 405, namely the foot, may be measured according to one embodiment. First, a three-dimensional digital model 400 of a leg is rendered. A plane 430 is then input transversely through the ankle of the leg or transversely through the boundary of the portion of the leg which denotes the beginning or start of the foot. For example, in embodiments, the plane 430 is input transversely through the narrowest width or circumference of the leg. The volume below the plane 430, wherein "below" is in the orientation of a standing person, is measured to provide the volume of the foot. In some embodiments, volume is determined by measuring the distance of a first linear segment drawn to delineate the widest width of the feature from left to right, then by measuring the distance of a linear segment drawn from a first point on the feature through the feature to a second point on feature from front to back, and then by utilizing points input that delineate the outline of the feature.

FIG. 11 demonstrates one way in which a circumference of a feature 405, namely a leg, may be measured according to one embodiment. First, a three-dimensional digital model 400 of a leg is rendered. A non-linear line segment 410 is input around the ankle of the leg such that a closed line segment 410 that extends entirely around the ankle is input. The line segment 410B then measures the distance of the closed line segment 410 to provide the circumference of the leg.

The present technology can be carried out with one or more of the embodiments described. The drawings show embodiments with the understanding that the present description is to be considered an exemplification of the principles and is not intended to be exhaustive or to limit the disclosure to the details of construction. The arrangements of the components are set forth in the following description or illustrated in the drawings.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

We claim:

1. A method of performing anatomical measurements of non-visible aspects of a feature in an anatomical region of a living organism, the feature having a contoured shape visible to the naked eye, the method comprising:
   (a) imaging only an external part of the anatomical region of the living organism, the imaging including imaging of the feature having the visible contoured shape;
   (b) acquiring measurements of a plurality of aspects of the imaged anatomical region which are visible to the naked eye;
   (c) producing a three-dimensional digital model of the anatomical region based on the acquired measurements;
   (d) determining that the feature is within the three-dimensional digital model of the anatomical region;
   (e) isolating a separate three-dimensional digital model of the feature from the three-dimensional digital model of the anatomical region, and displaying the separate three-dimensional digital model of the feature in a separate display location than a display location of the three-dimensional digital model of the anatomical region, thereby providing a three-dimensional representation of the entire feature; and
   (f) measuring the separate three-dimensional digital model of the feature to yield a measurement of the aspect of the feature,
   wherein the feature is selected from the group consisting of a breast, a nose, an ear, a penis, an arm, a leg, a hand, a foot, a back, a torso, a head, lips, a neck, a shoulder, an abdomen, a waist, an elbow, a wrist, a finger, a thigh, a knee, a calf, an ankle, a toe, or buttocks of the living organism, and wherein the aspect of the feature is selected from the group consisting of a volume of the feature, a depth of the feature, a surface angle of the feature, a area of the feature, a surface area of the feature, a base width of the feature, a mass of the feature, a distance between visible points of the feature, a surface distance between visible points of the feature, and a circumference of the feature.

2. The method of claim 1, wherein determining that the feature is within the three-dimensional digital model of the anatomical region is carried out automatically based on at least one of:
inputs entered about the type of feature known to be within the anatomical region;
a known shape of the feature within the anatomical region; and
manually entered inputs of the contours of the feature known to be within the anatomical region.

3. The method of claim 1, wherein the visible contoured shape includes a unique contour of the feature, which is visible to, and identifiable by, the naked eye, when looking at the living organism.

4. The method of claim 1, wherein the visible contoured shape includes a contour of the feature having an external surface which is measurable using a tape measure or goniometer, while the living organism is whole.

5. The method of claim 1, wherein the visible contoured shape includes a feature that can be traced or measured by wrapping a film around the exterior surface of the feature, while the living organism is whole.

6. The method of claim 1, wherein the visible contoured shape has a visible outer circumference. This is in contrast to internal contoured shapes, which lack visibility and are disposed under or within the outer circumference of the feature.

7. The method of claim 1, further comprising identifying the feature determined to be within the three-dimensional digital model of the anatomical region by manually inputting at least one of a plurality of points, a line segment, or a closed shape around the edges of the feature within the three-dimensional digital model to delineate the outline of the feature prior to isolating the separate three-dimensional digital model of the feature from the three-dimensional digital model of the anatomical region.

8. The method of claim 7, wherein isolating the separate three-dimensional digital model of the feature includes cutting the three-dimensional digital model of the anatomical region at a plane of the delineated outline of the feature.

9. The method of claim 8, wherein measuring the separate three-dimensional digital model of the feature to yield the measurement of the aspect of the feature includes drawing a linear line segment from a first point on the separate three-dimensional digital model of the feature to a second point on the separate three-dimensional digital model of the feature to delineate at least one of a width, length, height, or circumference of the feature.

10. The method of claim 9, wherein measuring the separate three-dimensional digital model of the feature to yield the measurement of the aspect of the feature further includes drawing a plane through the separate three-dimensional digital model of the feature to delineate at least one of a width, length, height or circumference of the feature.

11. The method of claim 1, wherein the measured aspect of the feature is depth, which is determined by measuring the length of a linear segment drawn from a first point on the separate three-dimensional digital model of the feature through the feature to a second point on the separate three-dimensional digital model of the feature.

12. The method of claim 1, wherein the measured aspect of the feature is volume, which is determined by:
measuring the distance of a first linear segment drawn on the separate three-dimensional digital model of the feature to delineate the widest width of the feature from left to right;
measuring the distance of a linear segment drawn from a first point on the separate three-dimensional digital model of the feature through the feature to a second point on the separate three-dimensional digital model of the feature from front to back; and
utilizing the end points of the first linear segment and of the second linear segment that delineate the outline of the feature.

13. The method of claim 12, wherein imaging the external part of the anatomical region of the living organism includes capturing a whole exterior of the anatomical region with a camera.

14. The method of claim 13, wherein the camera is the camera of a handheld electronic device selected from the group consisting of a scanner, smartphone, computer tablet, action camera, video recorder, glasses, goggles, headset, smart glasses, augmented reality (AR) headset, and virtual reality (VR) headset.

15. The method of claim 13, wherein acquiring the measurements of the plurality of aspects of the imaged anatomical region which are visible to the naked eye includes measuring, using orientation sensors, the whole exterior of the anatomical region during the imaging of the anatomical region.

16. The method of claim 15, wherein acquiring the measurements of the plurality of aspects of the imaged anatomical region which are visible to the naked eye comprises comparing between individually captured images of the anatomical region.

17. The method of claim 15, wherein the orientation sensors comprise sensors selected from the group consisting of accelerometers, gyroscopes, motion sensors, global positions systems, and local positioning systems.

18. The method of claim 1, wherein producing of the three-dimensional digital model of the anatomical region comprises producing a three-dimensional hologram of the anatomical region.

19. The method of claim 18, wherein isolating a separate three-dimensional digital model of the feature from the three-dimensional digital model of the anatomical region comprises isolating a separate three-dimensional hologram of the feature from the three-dimensional hologram of the anatomical region.

20. A system of performing anatomical measurements of mass of a feature in an anatomical region of a living organism, the feature having a contoured shape visible to the naked eye, the system comprising:
an imager for imaging the anatomical region of the living organism; and
an electronic device including a graphic user interface, an application programming interface, a processor, a memory, and a logic stored on the memory and executable by the processor, wherein when executed the logic performs steps (a) to (f) of the method of claim 1.

21. The system of claim 20, further comprising:
a cloud storage device for storing images and data; and
a cloud computing engine;
wherein the electronic device interfaces via the application programming interface to store or process images and data in the cloud storage device, memory, or cloud computation engine.

22. The system of claim 20, wherein the imager comprises a camera of a handheld electronic device selected from the group consisting of a scanner, smartphone, computer tablet, action camera, video recorder, glasses, goggles, headset, smart glasses, augmented reality (AR) headset, and virtual reality (VR) headset.

\* \* \* \* \*